Patented Oct. 29, 1940

2,219,660

UNITED STATES PATENT OFFICE 2,219,660

PRODUCTION OF CALCIUM HYPOCHLORITE PRODUCTS

Homer L. Robson and Gregory A. Petroe, Niagara Falls, N. Y., assignors to The Mathieson Alkali Works, Inc., New York, N. Y., a corporation of Virginia No Drawing. Application July 20, 1938, Serial No. 220,261

8 Claims. (Cl. 23—86)

This invention relates to improvements in the manufacture of granular, substantially dustless calcium hypochlorite products from aqueous slurries containing calcium hypochlorite.

Calcium hypochlorite products containing more than about 10% by weight of material which will pass a 100 mesh screen are characteristically dusty. Such dusty products suffer several disadvantages. Dustiness itself is objectionable. Further, however, the presence of such proportions of fines retards the penetration of water into masses of the product thus increasing the time required for solution, involves a tendency to form lumps during solution and involves a tendency toward packing and caking of the product during shipment and storage. Conventional practices for the production of dry calcium hypochlorite products of predetermined maximum particle size introduce, into the product, proportions of minus 100 mesh material usually much in excess of 10% and of this fine material a large proportion usually will pass a 300 mesh screen.

The process of our invention comprises three steps, (1) the bringing of the calcium hypochlorite slurry to a plastic state, (2) a special preforming of the plastic material and (3) a special drying of the preformed plastic material. The drying step includes, with advantage, a special preliminary drying operation. By means of this process, we can produce a desirable product, free flowing, granular and substantially dustless, conveniently and economically.

The first step of our process is effected by adjusting the water content and the air content of the calcium hypochlorite material. The proportion of water required varies with different calcium hypochlorite materials, with the proportion of $Ca(OCl)_2$ present and with the proportion of other substances and particularly lime present. In general the proportion of water will approximate not more than one-half the total solids present and not more than two-thirds the calcium hypochlorite present. The proportion of water decreases as the proportion of lime increases. The proportion of entrapped air required approximates 5-20%. A proportion of entrapped air approximating 15-20% is particularly advantageous.

The plastic calcium hypochlorite material produced by the first step of our process may, for example, contain about 15% by volume of entrapped air and analyze as follows:

| | Per cent by weight |
|---|---|
| Calcium hypochlorite | 50–53 |
| Calcium chlorate | 0–1 |
| Calcium hydroxide | 1–2 |
| Calcium carbonate | 0.5–1.5 |
| Calcium chloride | 0–1.5 |
| Sodium chloride | 11–14 |
| Water | 32–34 |

While 32–34% by weight is a particularly advantageous proportion of water in such a composition, proportions of water ranging from about 30% to about 36% are useful. The calcium compounds other than the hypochlorite, and in some instances and to some extent in such instances the hydroxide, present in this illustrative composition appear as incidents to the process of producing the original calcium hypochlorite slurry. The calcium hydroxide, or part of it, may be added as a stabilizer. The sodium chloride, or part of it, may appear as an incident to the process of producing the slurry, or this sodium chloride or part of it may be added as an extender or diluent to bring the final product to uniform concentration with respect to $Ca(OCl)_2$, a uniform concentration of 74% for example. Calcium hydroxide may also be used, within limits, as a diluent and when so used the proportion of water should be decreased about 1% for each added 1% of calcium hydroxide to secure equivalent plasticity. Other inert materials may be substituted for sodium chloride as a diluent.

The proportion of entrapped air in the plastic material can be reduced by mechanical working of the material. Excessive working of the material must be avoided to maintain a sufficient proportion of entrapped air in the material. Filtration or dewatering of the slurry supplied to the first step of our process can usually be so carried out as to incorporate a sufficient proportion of entrapped air. For example, a sufficient proportion of entrapped air may be left in the filter cake in a filtration carried out to adjust the water content of the material. Again for example, a finely divided dry calcium hypochlorite product may be added to the material to increase its air content. Again, such a filter cake may be partially dried, subsequent to filtration, with aeration.

The second step of our process is effected by passing the plastic material from the first step between closely spaced smooth, hard preforming rolls the adjacent surfaces of which move in the same direction but at somewhat different peripheral speeds. For example, these rolls may be from 10" to 20" in diameter, spaced from about 0.015", or better 0.020", to about 0.030–0.033", and bearing toward each other under a pressure of about one-half to two tons per lineal inch of effective roll length. With spacings less than about 0.020" the product tends to be somewhat brittle and may thus develop some dustiness. The spacing should be less than the maximum intended particle size in the final product, usually about 70–75% of this particle size. A differential in peripheral speed of about 10% is advantageous. This differential is important in imparting the desired structural characteristics to the product. Peripheral speeds of the general order of from 10 to 50 feet per minute are advantageous; speeds up to about 150 feet per minute are useful. The water content of the plastic material should, in general, be somewhat increased with increase in the peripheral speed of the preforming rolls.

The compressed plastic material adheres to the faster moving roll and is, with advantage, removed from this roll by a scraping knife so positioned as to crinkle and break the compressed material as it removes this material from the roll. The knife surface should make a total angle with the tangent to the roll at the point of removal of about 40–80° or better about 50–60°. This "total angle" is made up of the angle of the knife edge and the angle of rake. For example, we may use a 30° or 40° knife with a 20° rake. The angle of rake should not be less than about 10° nor more than about 30°.

The chips produced by the second step of our process are then dried in the third step of our process. The essential of this drying step is that it be carried out without substantial crushing of the chips. By this phrase we intend to refer to a method of drying which does not crush the material to an extent which will result in objectionable dustiness in the product. Minus 300 mesh material is responsible for most of the dustiness in calcium hypochlorite products, and the drying step therefore should involve an operation which produces substantially no fines capable of passing a 300 mesh screen. A rotary vacuum drier can be used to carry out the drying step of our combined process. Used for this purpose, such a drier should preferably contain no lifts, shelves or other projections on the inside of the shell and no stationary apparatus inside the shell, other than the vacuum manifold and its guard.

The compression to which the plastic material is subjected in the second step of our process produces chips with a small excess of surface moisture. This surface moisture gives these chips, as produced, a tendency to agglomerate. On storage for an appropriate period, this surface moisture becomes re-distributed through the chips and they lose this tendency. Such storage of the chips, in a manner avoiding agglomeration, becomes virtually impossible if large quantities are to be handled. Accordingly, in the preferred form of our process, we subject these chips to a preliminary drying just sufficient to eliminate this excess surface moisture in carrying out the third step of our process. This preliminary drying is conveniently effected by exposing the chips from the second step to a current of warm air. While the conditions of this drying may vary widely, we have found it advantageous to effect this preliminary drying by exposing the chips, usually for about 30–60 seconds, to a stream of air at a temperature of about 60–75° C. with a relative humidity of about 25%. The removal of excess surface moisture, and this tendency to agglomerate, can thus be effected without heating the chips to more than 35–40° C. and without materially changing the moisture content of the cores of the chips. The surface dried chips are then dried as previously described in carrying out the third step of our process.

After drying, and after any preliminary drying, the product is cooled, for example with a current of cool air, to minimize decomposition during handling and storage.

We claim:

1. In the production of a granular, substantially dustless calcium hypochlorite product, the improvement which comprises adjusting the water content and the entrapped air content of an aqueous slurry of calcium hypochlorite to about 30–36% by weight and about 5–20% by volume respectively, passing the resulting plastic material between smooth hard rolls spaced about 0.020–0.033 inch apart and turning together with different peripheral speeds, the speed differential being about 10%, removing the compressed plastic material from the faster moving roll, and drying the resulting chips without substantial crushing.

2. In the production of a granular, substantially dustless calcium hypochlorite product, the improvement which comprises adjusting the water content and the entrapped air content of an aqueous slurry of calcium hypochlorite to about 34–36% by weight and about 15–20% by volume respectively, passing the resulting plastic material between smooth hard rolls spaced about 0.020–0.033 inch apart and turning together with different peripheral speeds, the speed differential being about 10%, removing the compressed plastic material from the faster moving roll, and drying the resulting chips without substantial crushing.

3. In the production of a granular, substantially dustless calcium hypochlorite product, the improvement which comprises bringing an aqueous slurry of calcium hypochlorite to a plastic state, passing the resulting plastic material between smooth hard rolls spaced about 0.015–0.033 inch apart and turning together with different peripheral speeds, the speed differential being about 10%, removing the compressed plastic material from the faster moving roll, and drying the resulting chips without substantial crushing.

4. In the production of a granular, substantially dustless calcium hypochlorite product, the improvement which comprises bringing an aqueous slurry of calcium hypochlorite to a plastic state, passing the resulting plastic material between smooth hard rolls spaced about 0.015–0.033 inch apart and turning together with different peripheral speeds, the speed differential being about 10%, removing the compressed plastic material from the faster moving roll, preliminarily drying the resulting chips to remove excess surface moisture and then drying the surface dried chips without substantial crushing.

5. In the production of a granular, substantially dustless calcium hypochlorite product, the improvement which comprises bringing an aqueous slurry of calcium hypochlorite to a plastic state while maintaining an entrapped air content approximating 5-20%, passing the resulting plastic material between smooth hard rolls spaced about 0.020-0.033 inch apart and turning together with different peripheral speeds, the speed differential being about 10%, removing the compressed plastic material from the faster moving roll, and drying the resulting chips without substantial crushing.

6. In the production of a granular, substantially dustless calcium hypochlorite product, the improvement which comprises bringing an aqueous slurry of calcium hypochlorite to a plastic state while maintaining an entrapped air content approximating 15-20%, passing the resulting plastic material between smooth hard rolls spaced about 0.020-0.033 inch apart and turning together with different peripheral speeds, the speed differential being about 10%, removing the compressed plastic material from the faster moving roll, and drying the resulting chips without substantial crushing.

7. In the production of a granular, substantially dustless calcium hypochlorite product, the improvement which comprises bringing an aqueous slurry of calcium hypochlorite to a plastic state, passing the resulting plastic material between smooth hard rolls spaced about 0.020-0.033 inch apart and turning together with different peripheral speeds, the speed differential being about 10%, removing the compressed plastic material from the faster moving roll, with a knife making a total angle to the roll at the point of removal of about 40-80°, and drying the resulting chips without substantial crushing.

8. In the production of a granular, substantially dustless calcium hypochlorite product, the improvement which comprises bringing an aqueous slurry of calcium hypochlorite to a plastic state, passing the resulting plastic material between smooth hard rolls spaced about 0.020-0.033 inch apart and turning together with different peripheral speeds, the speed differential being about 10%, removing the compressed plastic material from the faster moving roll, with a knife making a total angle to the roll at the point of removal of about 50-60°, and drying the resulting chips without substantial crushing.

HOMER L. ROBSON.
GREGORY A. PETROE.